3,799,896
POLYISOCYANURATE
Ernest K. Moss, St. Petersburg, Fla., assignor to The Celotex Corporation, Tampa, Fla.
No Drawing. Continuation-in-part of abandoned application Ser. No. 4,050, Jan. 19, 1970. This application May 8, 1972, Ser. No. 251,279
Int. Cl. C08g 22/44
U.S. Cl. 260—2.5 AW                23 Claims

ABSTRACT OF THE DISCLOSURE

An improved polyisocyanurate comprising polymethylene polyphenylisocyanate having a functionality of 2.1 to 3.2 and having an equivalent weight between 120 and 180; a polyol having an equivalent weight between 30 and 100; a tertiary amine; an N-substituted aziridine; an organic epoxide, and a blowing agent.

These compositions exhibit an advantageous cream time and firm time and a reduced friability.

CROSS-REFERENCE TO RELATED APPLICATIONS

This application is a continuation-in-part of U.S. application Ser. No. 4,050, filed Jan. 19, 1970, now abandoned.

DISCLOSURE

Compositions of matter which cure to produce polyisocyanurate foams are well known in the art. However, for many industrial applications, it is necessary that these compositions have a cream time of 15 to 30 seconds and a firm time of 25 to 60 and preferably 25 to 50 seconds. This is to permit utilization of the composition in commercially available apparatus. Furthermore, the desired cream time and firm time must be achieved without adversely affecting the physical properties of the resultant foam. The physical property most often affected is friability. However, other physical properties such as density, flammability, closed cell percent, compressive strength, flexural strength, and thermal stability can also be adversely affected.

Accordingly, it is the object of the present invention to provide an improved composition of matter which is substantially free of one or more of the above disadvantages of prior compositions.

Another object is to provide an improved composition of matter which exhibits a cream time of 15 to 30 seconds, a firm time of 25 to 60 seconds and a friability less than 35 percent.

A further object of the present invention is to provide an improved composition which has the above-described cream time, firm time, and friability without adversely affecting the other physical properties of the resultant foam.

According to the present invention, there is provided an improved composition of matter comprising: polymethylene polyphenylisocyanate having a functionality of 2.1 to 3.2 and having an equivalent weight between 120 and 180; a polyol preferably a diol having an equivalent weight between 30 and 100; a tertiary amine; an N-substituted aziridine; an organic epoxide; a blowing agent, and a surfactant.

THE POLYMETHYLENE POLYPHENYLISOCYANATE

In the broadest aspect of the present invention, any polymethylene polyphenylisocyanate having the indicated functionality and indicated equivalent weight can be employed. Those polymethylene polyphenylisocyanates having a functionality of less than 2.1 are generally not acceptable because the resultant foams exhibit an undesirably high friability. Polymethyelne polyphenylisocyanates having a functionality greater than 3.2 also produce foams of too great a friability. Therefore, the polymethylene polyphenylisocyanates of the present invention generally have a functionality of 2.1 to 3.2 and preferably 2.3 to 3.0.

Polymethylene polyphenylisocyanates having an equivalent weight less than 120 tend to produce foams having too great a friability. Those having an equivalent weight greater than 180 are generally too viscous to make their use practical. Therefore, the polymethylene polyphenylisocyanates employed in the present invention generally have an equivalent weight between 120 and 180 and preferably have an equivalent weight between 130 and 145.

A preferred subclass of polymethylene polyphenylisocyanates especially useful in the present invention are a mixture of those of Formula I:

(I) 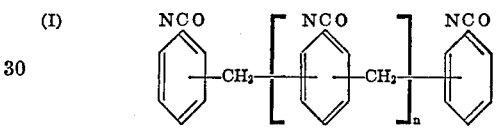

wherein $n$ is an integer from 0 to 8 and wherein the mixture has the above-described functionality and equivalent weight. This mixture should have a viscosity between 100 and 40,000 and preferably 250 to 2500 centipoises measured at 25° C. in order to be practical for use in the present invention.

Examples of suitable polymethylene polyphenylisocyanates useful in the present invention include those of Formula I, wherein $n$ is 1 as well as mixtures wherein $n$ can have any value from 0 to 8 as long as the mixture has the specified equivalent weight. One such mixture has 40 weight percent of $n=0$, 22 weight percent of $n=1$, 12 weight percent of $n=2$ and 26 weight percent of $n=3$ to about 8. The synthesis of polymethylene polyphenylisocyanates is described in Seeger et al. U.S. Pat. 2,683,730 and in Powers U.S. 3,526,652 at column 3, lines 6–21. It should, therefore, be understood that the polymethylene polyphenylisocyanate available on the market under the trade names Papi and Mondur MR can successfully be employed within the spirit and scope of the present invention.

Toluene diisocyanate and diisocyanatophenyl-methane both of which are commonly employed in prior art compositions, are unsuitable for use in the present invention. Both of these compounds have a functionality of only 2, which is below the indicated range. Furthermore, toluene diisocyanate has an equivalent weight of less than 120, which is below the desired range for equivalent weight. In the practice of the present invention it is not necessary to exclude all amounts of these two isocyanates as long as the mixture of organic polyisocyanates has a functionality and an equivalent weight within the specified range.

THE POLYOL

In the broadest aspects of the present invention, any polyol having an equivalent weight between 30 and 100, and preferably between 30 and 70 and having a functionality between 2 and 3, and having at least two hydroxyl groups which pass the Zerewitinoff Test, can be employed in the present invention. Diols are preferred, although triols and higher polyols can be employed in minor amounts generally less than 10% admixed with diols provided the equivalent weight of the mixture is within the specified range. The preferred diols are those of Formula II:

(II) $\quad\quad\quad\quad$ HO—R$^1$—OH wherein R$^1$ is selected from the group consisting of lower alkylene and lower alkoxyalkylene with at least two carbon atoms. Examples of suitable diols include, among others, ethylene glycol, propylene glycol; 1,3 propanediol; 1,4-butanediol; diethylene glycol, dipropylene glycol, dimethylol dicyclopentadiene, 1,3-cyclohexanediol; and 1,4-cyclohexanediol.

In order to ensure complete reaction, the polymethylene polyphenylisocyanate and the polyol are generally mixed in an equivalent ratio of 2:1 to 6:1 and preferably 3:1 to 4:1. In ranges outside these proportions the reaction yields a product having undesirable physical characteristics. At higher ratios the product has an undesirably high friability. At lower ratios the product has an undesirably high flammability.

THE TERTIARY AMINE

A wide variety of tertiary amines can be employed in the present invention as long as they are soluble in either the polymethylene polyphenylisocyanate or the polyol. One preferred class of tertiary amines are compounds of Formula III:

(III) 

wherein R$^2$, R$^3$, and R$^4$ are independently selected from the group consisting of alkyl, aryl, aralkyl, and alkaryl. Tertiary amines containing more than one amino nitrogen are also suitable. Examples of suitable tertiary amines include, among others, ortho (dimethylaminomethyl) phenol, tris (2,4,6-dimethyl aminomethyl) phenol, trimethylaminopropylpiperazine, 1,4 - diazabicyclo[2.2.2] octane, tetramethylethylene diamine, tetramethylpropane diamine.

The preferred tertiary amine is tris(2,4,6-dimethyl aminomethyl) phenol. The tertiary amine generally comprises from 0.01 to 5, and preferably from 0.1 to 2, weight percent of the composition.

THE N-SUBSTITUTED AZIRIDINE

In the broadest aspect of the present invention, any N-substituted aziridine which is soluble in either the polymethylene polyphenylisocyanate or the polyol can be employed in the present invention. However, the preferred N-substituted aziridines are compounds of Formula IV:

(IV) 

wherein R$^5$ is alkyl, aryl, aralkyl, alkaryl, hydroxyalkyl or alkoxyalkylene. Examples of suitable N-substituted aziridines include, among others, N-methyl aziridine, N-ethylaziridine, N - (2 - hydroxyethyl) aziridine, N-(dimethylaminopropyl) aziridine, benzyl aziridine, chloropropyl aziridine, phenyl aziridine and N-(ethoxyethyl) aziridine. The preferred N-substituted aziridine is N-(2-hydroxyethyl)aziridine. The N-substituted aziridine generally comprises from 0.01 to 5, and preferably from 0.1 to 2, weight percent of the composition.

THE EPOXIDE

In the broadest aspects of the present invention, any epoxide can be employed which is soluble in either the polyol or the polymethylene polyphenylisocyanate. One preferred class of epoxides are those of Formula V:

(V) 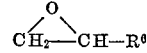

wherein R$^6$ is hydrogen, alkyl, aryl, aralkyl, alkaryl, or hydroxyalkylene. Another group of suitable epoxides includes the diepoxides. Examples of suitable epoxides include, among others, ethylene oxide, propylene oxide, butene oxide, the glycidyl ethers of bisphenol A, resorcinol, phenol and other substituted phenols and aliphatic alcohols; styrene oxide, vinyl cyclohexane dioxide, dipentenedioxide, alloocimene dioxide, and bis (2,3-epoxycyclopentyl) ether. The epoxide generally comprises from 0.1 to 10, and preferably from 0.5 to 5, weight percent of the composition. In lesser amounts the firm time of the compositions is undesirably great, whereas in greater amounts, the heat of the exothermic reaction tends to discolor the foam.

THE BLOWING AGENT

Any blowing agent characteristically employed in similar prior art products can be employed in the composition of the present invention. In general, these blowing agents are liquids having a boiling point between 0° C. and 100° C. Examples of suitable blowing agents include, among others, chlorinated and fluorinated hydrocarbons such as fluorotrichloromethane which is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, parts by weight of the composition. When the blowing agent has a boiling point at or below ambient, it is maintained under pressure until mixed with the other components. Alternatively, it can be maintained at subambient temperatures until mixed with the other components. Difluorodichloromethane is the preferred blowing agent having a boiling point below 25° C. at atmospheric pressure.

THE SURFACTANT

Successful results have been obtained with silicone/ethylene-oxide/propylene-oxide copolymers as surfactants. The surfactant molecules act as nucleating points from which bubbles can be initially formed and they further stabilize the bubbles after formation to allow preparation of foam. Among the many surface-active materials mentioned in the patent literature as cell-size control agents and stabilizers for urethane foams are alkoxy silanes, polysilylphosphonates, polydimethyl siloxane and polydimethylsiloxane-polyoxyalkylene block copolymers. For a more detailed explanation of the function of the surfactant in the manufacture of foamed polyurethane and polymethylene polyphenylisocyanate compounds, reference is made to an article entitled "How Silicone Surfactants Affect Polyurethane Foams" in Modern Plastics, January 1967 edition, pp. 133 ff., of which Robert J. Boudreau is the author.

Examples of surfactants useful in the present invention include, among others, polydimethylsiloxane-polyoxyalkylene block copolymers available from the Dow Corning Corporation under the trade name "DC-193."

The surfactant generally comprises from 0.05 to 4, and preferably comprises from 0.1 to 2, weight percent of the composition.

THE PROCESS

The compositions of the present invention are simply produced by mixing the components with the result that foaming and curing take place. The resultant can then be cut and shaped by well-known methods. The mixing can be accomplished at widely varying temperatures, but is generally accomplished at 0 to 50° C., and preferably at 10 to 30° C. The ideal temperature is 15° C. At lower temperatures, the cream time is undesirably long, whereas at higher temperatures, the cream time and firm time are undesirably short. Furthermore, at higher temperatures there is a tendency for the foam to char because of the added heat due to the exothermic reaction.

The components of the composition of the present invention can be mixed in any order. The preferred order is to produce a first component by mixing the polymethylene polyphenylisocyanate with the blowing agent. A second component is simultaneously produced by mixing the polyol, the surfactant, and the epoxide. A third component is formed by mixing the tertiary amine and the N-substituted aziridine. The first component and the second component are preferably intimately mixed, whereupon the third component is added. It is upon addition of the third component that timing starts to determine the cream time and the firm time. For commercial use a high speed mixing device known in the art can be used. In this device all components are simultaneously metered directly into the device.

EXAMPLES

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the synthesis and properties of a preferred composition of the present invention.

The following quantities of the following ingredients are combined as indicated:

| Item | Name | Quantity Grams | Gram-equivalents |
|---|---|---|---|
| A | Mondur MR | 560 | 4.2 |
| B | Ethylene glycol | 42 | 1.35 |
| C | Tris (2,4,6-dimethylaminomethyl) phenol | 4 | |
| D | N-(2-hydroxyethyl) aziridine | 4 | |
| E | Propylene oxide | 10 | |
| F | CFCl₃ | 70 | |
| G | Silcone surfactant, Dow Corning "DC-193". | 6 | |

All ingredients are at 15° C. Items A and F are mixed in a first vessel. Items B, E, and G are mixed in a second vessel. Items C and D are mixed in a third vessel. The contents of the first and second vessel are then thoroughly mixed, whereupon the contents of the third vessel are added. An exothermic reaction ensues, eventually producing a foam. During the reaction the cream time and firm time are noted and are recorded in Table I. The friability of the cured composition is measured and the results recorded in Table I.

EXAMPLES 2, 3, AND 4

These comparative examples illustrate compositions not within the scope of the present invention, wherein either the epoxide, the N-substituted aziridine, or the tertiary amine is missing.

The procedure of Example 1 is repeated employing the same times, conditions, and reactants, except that item C is omitted in Example 4, item D is omitted in Example 3, and item E is omitted in Example 2. The results are recorded in Table I.

By reference to Table I, it can be seen that by omitting the tertiary amine (item C), an undesirably large firm time occurs. By omitting the N-substituted aziridine (item D) the firm time is out of limits on the high side notwithstanding an increase in item C necessary to keep the cream time within limits. Likewise, when the epoxide (item E) is omitted in Example 2, the firm time is undesirably great.

EXAMPLE 5

This comparative example of a composition not within the scope of the present invention illustrates the undesirable results obtained when a polyol of equivalent weight outside the desired range is employed.

The procedure of Example 1 is repeated employing the same conditions, times, and ingredients, with the single exception that the ethylene glycol is replaced by an equal amount of polyol G–2410. By reference to Table I, it can be seen that the firm time is undesirably large and the friability is undesirably great.

EXAMPLE 6

This comparative example of a composition not within the scope of the present invention illustrates the undesirable results obtained when a high functionality polyol of equivalent weight outside the desired range is employed at the same ratio of equivalents of hydroxyl to isocyanate as the low equivalent weight diol.

The procedure of Example 5 is repeated employing the same conditions, times, and ingredients with the exception that the sorbitol polyol, G–2410, and isocyanate are added at a ratio of 1 equivalent of hydroxyl to 3 equivalents of isocyanate group as in Example 1. By reference to Table I, it can be seen that the firm time is undesirably large and the friability and flammability have increased. Flammability is measured as burn extent and oxygen index. The polyol (G–2410) has an equivalent weight of 114 and a functionality of 6.

EXAMPLE 7

This comparative example of a composition not within the scope of the present invention illustrates the undesirable results obtained when a high functionality polyol of equivalent weight within the desired range is employed.

The procedure of Example 1 is repeated employing the same conditions, times, and ingredients, with the single exception that the ethylene glycol is replaced by an equal amount of polyol G–2406. By reference to Table I, it can be seen that the firm time is undesirably large and friability is undesirably great. The polyol (G–2406) has an equivalent weight of 87.5 and a functionality of 6.

EXAMPLE 8

This comparative example of a composition not within the scope of the present invention illustrates the undesirable results when a high functionality polyol of equivalent weight within the desired range is employed at the same ratio of equivalents of hydroxyl to isocyanate as Example 1, i.e. 1:3.

The procedure of Example 7 is repeated employing the same conditions, times, and ingredients with the exception that the polyol, G–2406, and isocyanate are added at a ratio of 1 equivalent of hydroxyl to 3 equivalents of isocyanate as in Example 1. By reference to Table I, it can be seen that the firm time is undesirably large and the friability is undesirably great and flammability is increased.

EXAMPLE 9

This example illustrates yet another composition of the present invention employing yet a different isocyanate.

The procedure of Example 1 s repeated employing the same times, conditions, and ingredients, except that item A is replaced with 572 grams of the mixture of isocyanates produced in accordance wth Example 1 of U.S. Pat. 2,683,730, with similar results.

from dark brown to cream colored. This color change is also accompanied by a simultaneous increase in volume.

TABLE I

|  | Example Number |  |  |  |  |  |  |  | Example 1 (percent) |
|---|---|---|---|---|---|---|---|---|---|
|  | 1 | 2 | 3 | 4 | 5 | 6 | 7 | 8 |  |
| OH:NCO equivalents | 1:3 | 1:3 | 1:3 | 1:10 | 1:3 | 1:3 | 1:9 | 1:3 | |
| Components: | | | | | | | | | |
| A. Mondur MR | 560 | 560 | 560 | 560 | 560 | 466 | 560 | 492 | 80.5 |
| B. Ethylene glycol | 42 | 42 | 42 | 42 | | | | | 6.1 |
| G-2410 | | | | | | 42 | 134 | | |
| G-2406 | | | | | | | 42 | 108 | |
| C. Tris(2,4,6-dimethylamino methyl)-phenol | 4 | 4 | 10 | 0 | 9 | 10 | 10 | 8 | .58 |
| D. N-(2-hydroxyl ethyl) aziridine | 4 | 4 | 0 | 8 | 9 | 10 | 10 | 8 | .58 |
| E. Propylene oxide | 10 | 10 | 10 | 10 | 10 | 10 | 10 | 10 | 1.43 |
| F. CFCl$_3$ | 70 | 80 | 70 | 70 | 75 | 75 | 75 | 70 | 10.1 |
| G. Surfactant | 6 | 6 | 6 | 6 | 6 | 6 | 6 | 6 | .86 |
| Results: | | | | | | | | | |
| Cream time (seconds) | 18 | 20 | 17 | 21 | 25 | 21 | 21 | 17 | |
| Firm time (seconds) | 45 | 70 | >200 | Inc. | 95 | 75 | 90 | 90 | |
| Friability, 10 min., weight loss | 25 | 34 | 19 | | 72 | 56 | 65 | 59 | |
| Burn extent, inches | 10.6 | 10.7 | 10.5 | | 9.1 | 13.1 | 9.1 | 12.7 | |
| Oxygen index | 24.9 | 24.7 | 25.4 | | 26.4 | 22.7 | 26.0 | 23.2 | |
| Percent closed cells | 86 | | 87 | | | | | | |
| Density, lbs./ft.$^3$ | 1.9 | 2.2 | 2.0 | | 2.1 | 2.0 | 2.0 | 1.9 | |

NOTE.—Inc.="incomplete"—reaction is incomplete and has a firm time in excess of 300 seconds.

EXAMPLE 10

This example illustrates another composition of the present invention.

The following quantities of the following ingredients are combined as indicated in Exampe 1.

| Item | Name | Grams |
|---|---|---|
| A | Mondur MR | 560 |
| B | Ethylene glycol | 42 |
| C | Tris(2,4,6-dimethylamino methyl) phenol | 4.65 |
| D | N-(2-hydroxyethyl)aziridine | 4.65 |
| E | Propylene oxide | 10 |
| F | CFCl$_3$ | 55 |
| G | Silicone surfactant Dow Corning 311 | 6 |

Cream and firm times, density, burn extent, closed cell content, friability after 10 minutes, and weight loss at 300° C. were 18 and 44 seconds, 1.85 lbs./ft.$^3$, 10.6 inches, 85%, 25%, 16%.

EXAMPLE 11

This comparative example illustrates the adverse effect on firm time of eliminating the epoxide.

Example 10 is repeated employing the same times, conditions, and ingredients, except that item E is omitted with the result that the firm time is 70 seconds. This is an undesirably great firm time.

In the instant specification, for the definitions of $R^2$ through $R^6$ inclusive, it will be understood that the preferred alkyl radicals are lower alkyl radicals, example of which include among other methyl, ethyl, propyl, isobutyl, t-butyl, and isooctyl. The preferred aryl radicals are phenyl and naphthyl. The preferred alkaryl radical is benzyl. The preferred aralkyl radical is phenyl substituted with 1 to 5, and preferably 1 or 2 lower alkyl radicals.

In the above examples the tri (2,4,6-dimethylaminomethyl) phenol is that supplied by the Rohm & Haas Chemical Company under the trade name DMP-30.

In Examples 5, 6, and 7 the polyols employed are those sold by the Atlas Chemical Company under the trade names Atpol G-2406 and Atpol G-2410 having an equivalent weight of 87.5 and 114 grams per hydroxyl group respectively. These polyols are the propylene oxide adducts of sorbitol having hydroxyl number of about 640 and 490 respectively.

In the above examples, the N-(2-hydroxy ethyl) aziridine is that supplied by the Dow Chemical Company under the trade name "SA-1051."

GLOSSARY

Cream time.—The time interval beginning with the addition of the N-substituted aziridine and the tertiary amine and ending when the composition changes color from dark brown to cream colored. This color change is also accompanied by a simultaneous increase in volume.

Unless otherwise indicated, the reactants are mixed at 15° C. under ambient conditions of atmospheric pressure and room temperature (25° C.).

Equivalent weight.—The molecular weight of the component divided by its functionality. For example, ethylene glycol has a molecular weight of 62.07 and has two hydroxyl groups or a functionality of 2. Therefore, the equivalent weight of ethylene glycol is 62.07/2 or approximately 31. The equivalent weight of the polymethylene polyphenylisocyanate is of course determined by dividing the average molecular weight by the average number of isocyanate groups present per molecule. These equivalent weights can also be determined empirically.

Firm time.—The time interval beginning with the addition of the N-substituted aziridine and the tertiary amine and ending when the composition is sufficiently cured such that a test specimen five inches by one inch by one inch is self-supporting without sagging when supported from its ends one inch off a table.

Burn extent.—This is measured in terms of burn extent in the Monsanto Tunnel, as described by M. M. Levy, Journal of Cellular Plastics, April 1967, and by H. L. Vandersall, Journal of Paint Technology, 39, 494 (1967). Conventional non-flame-retardant urethanes burn in excess of 23 inches (length of tunnel), while moderately flame-retardant conventional foams burn 15–20 inches and highly flame-retardant conventional foams burn 10–15 inches in this tunnel.

Friability.—The propensity of the foam to break expressed in percent weight loss. This is determined by the ASTM C-421 friability test conducted for 10 minutes.

Thermal stability.—The ability of the foam to maintain its weight at elevated temperatures. A temperature of 300° C. is used for all tests. Thermal stability is expressed as percent weight loss and is measured by thermogravimetric analysis according to the technique described by J. E. Sheridan et al. in the Journal of Cellular Plastics, May-June 1971.

Oxygen index.—This is the measure of the flammability. The higher the number, the less flammable is the product. This is measured according to ASTM D-2863-70 except that a sample measuring ½" x ½" x 6" is used. A reading of 24 or greater is desired.

What is claimed is:

1. A polyisocyanurate foam comprising the reaction product of:
    (A) polymethylene polyphenylisocyanate
        (1) having a functionality of 2.1 to 3.2, and
        (2) having an equivalent weight between 120 and 180,
    (B) a polyol having an equivalent weight between 30 and 100, and a functionality between 2 and 3, (C) a tertiary amine,
(D) an N-substituted aziridine,
(E) an organic epoxide,
(F) a blowing agent,
(G) a surfactant.

2. A composition of matter of claim 1, wherein the polyol is a diol.

3. A composition of claim 1 wherein the polymethylene polyphenylisocyanate is a mixture of polymethylene polyphenylisocyanates of Formula I:

(I) 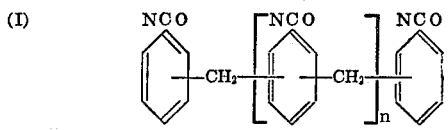

wherein $n$ is an integer from 0 to 8, wherein the mixture has:
(a) a functionality of 2.1 to 3.2,
(b) an equivalent weight between 120 and 180, and
(c) a viscosity of 250 to 2500 centipoises measured at 25° C.

4. A composition of matter of claim 1 wherein the polyol is one of Formula II:

(II)             HO—R$^1$—OH wherein R$^1$ is lower alkylene or lower-alkoxy alkylene.

5. A composition of matter of claim 1 wherein the polyol consists essentially of ethylene glycol.

6. A composition of matter of claim 1 wherein the tertiary amine is a compound of Formula III:

(III) 

wherein R$^2$, R$^3$, and R$^4$ are independently selected from the group consisting of alkyl, aryl, aralkyl and alkaryl.

7. A composition of matter of claim 1 wherein the tertiary amine is tris (2,4,6-dimethylaminomethyl) phenol.

8. A composition of matter of claim 1 wherein the N-substituted aziridine is a compound of Formula IV:

(IV) 

wherein R$^5$ is selected from the group consisting of alkyl, aryl, aralkyl, alkaryl, hydroxyalkyl and alkoxyalkylene.

9. A composition of matter of claim 8 wherein R$^5$ is loweralkyl or hydroxyloweralkylene.

10. A composition of matter of claim 1 wherein the N-substituted aziridine is N-(2-hydroxyethyl) aziridine.

11. A composition of matter of claim 1 wherein the organic epoxide is one of Formula V:

(V) 

wherein R$^6$ is selected from the group consisting of alkyl, aryl, aralkyl, alkaryl, alkoxyalkylene, and hydrogen.

12. A composition of matter of claim 1 wherein the epoxide is vinyl cyclohexane dioxide.

13. A composition of matter of claim 1 wherein the organic epoxide is ethylene oxide.

14. A composition of matter of claim 1 wherein the organic epoxide is propylene oxide.

15. A composition of matter of claim 1 wherein the blowing agent is a liquid having a boiling point between 0° C. and 100° C.

16. A composition of matter of claim 1 wherein the blowing agent is fluorotrichloromethane.

17. A composition of matter of claim 2 wherein:
the equivalent ratio of (A):(B) is 2:1 to 6:1,
(C) comprises 0.01 to 5 weight percent of the composition,
(D) comprises 0.01 to 5 weight percent of the composition,
(E) comprises 0.1 to 10 weight percent of the composition,
(F) comprises 1 to 30 weight percent of the composition,
(G) comprises 0.05 to 4 weight percent of the composition.

18. A composition of matter of claim 1 comprising:
(A) polymethylene polyphenylisocyanate which is a mixture of polymethylene polyphenylisocyanates of Formula I:

(I) 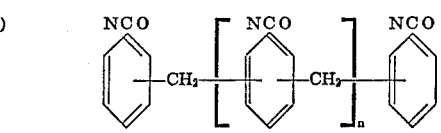

wherein the mixture has:
(a) a functionality of 2.1 to 3.2,
(b) an equivalent weight between 120 and 180,
(c) a viscosity between 250 and 2500 centipoises, and
(d) $n$ is from 0 to 8,
(B) a polyol having an equivalent weight between 30 and 60, and having Formula II:

(II)             HO—R$^1$—OH wherein R$^1$ is selected from the group consisting of loweralkylene and loweralkoxyalkylene,
(C) a tertiary amine of Formula III:

(III) 

wherein R$^2$, R$^3$, and R$^4$ are independently selected from the group consisting of alkyl, aryl, aralkyl, and alkaryl,
(D) an N-substituted aziridine of Formula IV:

(IV) 

wherein R$^5$ is selected from the group consisting of alkyl, aryl, aralkyl, alkaryl, hydroxyalkyl, and alkoxyalkylene,
(E) an organic epoxide of Formula V:

(V) 

wherein R$^6$ is selected from the group consisting of alkyl, aryl, aralkyl, alkaryl, alkoxyalkylene, and hydrogen,
(F) a blowing agent,
(G) a surfactant,
wherein,
the equivalent ratio of (A):(B) is 2:1 to 6:1,
(C) comprises 0.1 to 2 weight percent of the composition,
(D) comprises 0.1 to 2 weight perecnt of the composition,
(E) comprises 0.5 to 5 weight percent of the composition,
(F) comprises 5 to 20 weight percent of the composition,
(G) comprises 0.1 to 2 weight percent of the composition.

19. A composition of matter of claim 1 consisting essentially of:
(A) a mixture of polymethylene polyphenylisocyanates of Formula I:

(I) 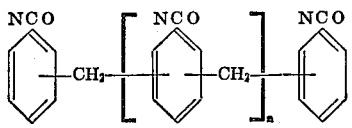

wherein:
30 to 50 weight percent are compounds of Formula I wherein $n$ is 0,
15 to 30 weight percent are compounds of Formula I wherein $n$ is 1,
5 to 15 weight percent are compounds of Formula I wherein $n$ is 2,
the balance are compounds of Formula I wherein $n$ is 3 to 8,
(B) ethylene glycol,
(C) tris(2,4,6-dimethylaminomethyl) phenol,
(D) N-(2-hydroxyethyl) aziridine,
(E) propylene oxide,
(F) fluorotrichloromethane,
(G) a surfactant,
wherein:
the equivalent ratio of (A):(B) is 2:1 to 6:1,
(C) comprises 0 to 2 weight percent of the composition,
(D) comprises 0.1 to 2 weight percent of the composition,
(E) comprises 0.5 to 5 weight percent of the composition,
(F) comprises 5 to 20 weight percent of the composition,
(G) comprises 0.1 to 2 weight percent of the composition,
wherein the composition exhibits a cream time of 15 to 25 seconds and a firm time of 30 to 60 seconds and wherein the cured composition has the physical form of a foam having a friability less than 35 percent.

20. A process for producing a polyisocyanurate foam comprising:
(I) admixing:
(A) polymethylene polyphenylisocyanate
(1) having a functionality of 2.1 to 3.2, and
(2) having an equivalent weight between 120 and 180,
(B) a polyol having an equivalent weight between 30 and 100, and having a functionality between 2 and 3,
(C) a tertiary amine,
(D) an N-substituted aziridine,
(E) an organic epoxide,
(F) a blowing agent, and
(G) surfactant,
(II) recovering the polyisocyanurate foam.

21. The process of claim 20 wherein the admixing is conducted under ambient pressure at an initial temperature of 0 to 50° C.

22. A process of claim 20 for producing a polyisocyanurate foam comprising:
(I) admixing at 0 to 50° C.:
(A) polymethylene polyphenylisocyanate which is a mixture of polymethylene polyphenylisocyanates of Formula I:

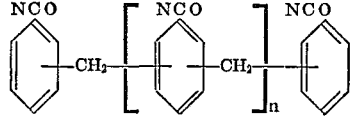

wherein the mixture has:
(a) a functionality of 2.1 to 3.2,
(b) an equivalent weight between 120 and 180,
(c) a viscosity between 250 and 2500 centipoises, and
(d) $n$ is from 0 to 8.
(B) a polyol having an equivalent weight between 30 and 60, and having Formula II:

(II)      HO—R$^1$—OH wherein R$^1$ is selected from the group consisting loweralkylene and loweralkoxyalkylene,
(C) a tertiary amine of Formula III:

(III) 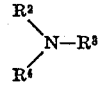

wherein R$^2$, R$^3$, and R$^4$ are independently selected from the group consisting of alkyl, aryl, aralkyl, and alkaryl,
(D) an N-substituted aziridine of Formula IV:

(IV) 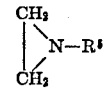

wherein R$^5$ is selected from the group consisting of alkyl, aryl, aralkyl, alkaryl, hydroxyalkyl, and alkoxyalkylene,
(E) an organic epoxide of Formula V:

(V) 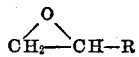

wherein R$^6$ is selected from the group consisting of alkyl, aryl, aralkyl, alkaryl, alkoxyalkylene, and hydrogen,
(F) a blowing agent,
(G) a surfactant,
wherein,
the equivalent ratio of (A):(B) is 2:1 to 6:1,
(C) comprises 0.1 to 2 weight percent of the composition,
(D) comprises 0.1 to 2 weight percent of the composition,
(E) comprises 0.5 to 5 weight percent of the composition,
(F) comprises 5 to 20 weight percent of the composition,
(G) comprises 0.1 to 2 weight percent of the composition,
and then
(II) recovering the polyisocyanurate foam.

23. A polyisocyanurate foam comprising the reaction product of:
(A) polymethylene polyphenylisocyanate
(1) having a functionality of 2.1 to 3.2, and
(2) having an equivalent weight between 120 and 180,
(B) ethylene glycol,
(C) tris(2,4,6-dimethylaminomethyl)phenol,
(D) N-(2-hydroxyethyl)aziridine,
(E) propylene oxide,
(F) fluorotrichloromethane, and
(G) a surfactant.

References Cited
UNITED STATES PATENTS
3,354,100   11/1967   Kuryla  ---------- 260—18 TN FOREIGN PATENTS
871,163   5/1971   Canada  -------- 260—2.5 AW MAURICE J. WELSH, Jr., Primary Examiner U.S. Cl. X.R.

252—188.3, 426; 260—2.5 AC, 77.5 NC

UNITED STATES PATENT OFFICE
CERTIFICATE OF CORRECTION

Patent No. 3,799,896                    Dated March 26, 1974

Inventor(s) Ernest K. Moss

It is certified that error appears in the above-identified patent and that said Letters Patent are hereby corrected as shown below:

Column 4, line 58, "inthe" should read as --in the--
Column 6, line 73, "s" should read as --is--
Table I, OH:NCO equivalents, example 4, "1:10" should read as --1:3--
Table I, OH:NCO equivalents, example 5, "1:3" should read as --1:10--
Column 10, line 45 Formula IV should read as

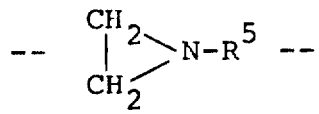

In all appropriate formulae the nitrogen atom of the NCO group is attached to the benzene ring.

Signed and sealed this 30th day of July 1974.

(SEAL)
Attest:

McCOY M. GIBSON, JR.
Attesting Officer

C. MARSHALL DANN
Commissioner of Patents